US007228449B2

(12) United States Patent
Guenther

(10) Patent No.: US 7,228,449 B2
(45) Date of Patent: Jun. 5, 2007

(54) METHOD AND DEVICE FOR TRANSMITTING A SELECTION SIGNAL FROM A PROCESSOR TO A PERIPHERAL BY VIOLATING A SYMMETRY OF TRANSMISSION OF A DATA SIGNAL

(75) Inventor: Uwe Guenther, Nufringen (DE)

(73) Assignee: Robert Bosch GmbH, Stuttgart (DE)

( * ) Notice: Subject to any disclaimer, the term of this patent is extended or adjusted under 35 U.S.C. 154(b) by 562 days.

(21) Appl. No.: 10/643,616

(22) Filed: Aug. 18, 2003

(65) Prior Publication Data
US 2004/0107378 A1 Jun. 3, 2004

(30) Foreign Application Priority Data
Aug. 14, 2002 (DE) .................................. 102 37 174

(51) Int. Cl.
*G06F 1/04* (2006.01)
(52) U.S. Cl. ..................... 713/400; 713/500; 713/600
(58) Field of Classification Search ................ 713/400, 713/401, 500, 600
See application file for complete search history.

(56) References Cited

U.S. PATENT DOCUMENTS 6,378,017 B1 * 4/2002 Girzon et al. ............... 710/306
6,920,604 B2 * 7/2005 Coakeley et al. ........... 714/802
6,934,785 B2 * 8/2005 Lee et al. .................... 710/300

FOREIGN PATENT DOCUMENTS

DE        100 36 637        2/2002

* cited by examiner

*Primary Examiner*—Rehana Perveen
*Assistant Examiner*—Paul Yanchus, III
(74) *Attorney, Agent, or Firm*—Kenyon & Kenyon LLP

(57) ABSTRACT

The present invention provides a method and a device for serial transmission of data between a processor module and at least one peripheral element with the aid of a timing signal, a data signal and a selection signal. To reduce the number of lines necessary for the serial data transmission between the processor module and the at least one peripheral element at high data rate, the timing signal may be transmitted via two timing lines between the processor module and the at least one peripheral element, the data signal may be transmitted via two data lines between the processor module and the at least one peripheral element, and the selection signal may be transmitted via the data lines.

14 Claims, 2 Drawing Sheets

METHOD AND DEVICE FOR TRANSMITTING A SELECTION SIGNAL FROM A PROCESSOR TO A PERIPHERAL BY VIOLATING A SYMMETRY OF TRANSMISSION OF A DATA SIGNAL

FIELD OF THE INVENTION

The present invention relates to serial transmission of data between a processor module, particularly of a control unit of a motor vehicle, and at least one peripheral element. The data is transmitted with the aid of a timing signal, a data signal and a selection signal.

BACKGROUND INFORMATION

Serial transmission of data between a processor module and peripheral elements in an electronic system is well known. The electronic system may be designed, for example, as an engine control unit, as a transmission control unit or as a brake control unit for a motor vehicle. The data transmission between the processor module and peripheral elements may be used for the triggering of the peripheral element by the processor module.

A processor module may include a computing element taking the form of, for example, a microprocessor. The peripheral elements may be formed, for example, as a monitoring circuit, particularly as a watchdog, as a serial EEPROM (electronically erasable and programmable read-only memory), as a stabilizing circuit or as an output-stage circuit, for instance, for the injection of fuel for an internal combustion engine. The processor module may also include a device for implementing the serial data transmission between the processor module and the peripheral elements. The device may be designed, for instance, as a serial interface, particularly as an SPI (serial peripheral interface)-bus interface.

For the data transmission between processor module and peripheral elements, four lines may be provided in the conventional methods and devices, namely:

- a timing line for the clock-pulse transmission,
- a data line from the processor module to the peripheral elements,
- a data line from the peripheral elements to the processor module, and
- a selection line to each individual peripheral element for controlling and addressing the peripheral element.

The timing line may also be denoted as a clock line, and the selection line may also be denoted as a chip-select line. A device and a data-transmission method of this kind, as well as a processor module involved in the method of this kind, are disclosed, for example, in German Patent No. 100 36 637.

To reduce the radiant emittance and to improve the electromagnetic compatibility (EMC) at higher data rates, it is also conventional to transmit the timing signal and the data signal as differential signals via two lines in each instance. To that end, in each case two timing lines and two data lines are routed to the peripheral elements. The selection lines may still be provided.

This may mean that at least five lines are needed solely for the purpose of transmitting data from the processor module to one or more peripheral elements.

SUMMARY OF THE INVENTION

The present invention reduces the number of lines needed for a serial data transmission between a processor module and at least one peripheral element at a high data rate.

In accordance with the present invention, the timing signal is transmitted via two timing lines between the processor module and the at least one peripheral element; the data signal is transmitted via two data lines between the processor module and the at least one peripheral element; and the selection signal is transmitted on the data lines.

In accordance with the present invention, it is possible to dispense with the selection line between the processor module and the peripheral elements, without impairing the data transmission. The selection signals for synchronizing and addressing the peripheral elements may be transmitted via the data lines. The expenditure of time and energy for the circuit wiring in a control unit, and the number of terminals at the processor module and at the peripheral elements may be reduced accordingly.

Various methods may be used for transmitting the selection signal in addition to the data signal via the data lines. The transmission of the selection signal may either be carried out synchronously with respect to the transmission of the data signal, or the transmission may be carried out in a time-staggered manner with respect to it. The data transmission may be slightly delayed because of the transmission of the selection signal via the data lines. However, the delay to be expected is small. The EMC characteristics of the processor module likewise does not deteriorate when using the method of the present invention.

The data signal may be transmitted on a first data line, and an inverted data signal may be transmitted on a second data line. In the same manner, the timing signal may be transmitted on a first timing line, and an inverted timing signal may be transmitted on a second timing line.

In another exemplary embodiment of the present invention, the symmetry of the transmission of the data signal is violated for the transmission of the selection signal. By this short-duration symmetry or parity violation of the transmission on the data line, it is possible to transmit the selection signal in a simple, reliable manner via the data lines.

According to another exemplary embodiment of the present invention, a symmetry violation between two transmitted data words or a group of data words may be used for synchronizing the at least one peripheral element.

In another exemplary embodiment of the present invention, at least one specifiable bit may be transmitted between two defined symmetry violations, and the at least one specifiable bit may be used for addressing the at least one peripheral element.

The address space for addressing the at least one peripheral element may be predefined by varying the time interval between the symmetry violations.

In another exemplary embodiment of the present invention, the timing signal may be transmitted via two timing lines between the processor module and the at least one peripheral element; the data signal may be transmitted via two data lines between the processor module and the at least one peripheral element; and the selection signal may be transmitted via the data lines.

In another exemplary embodiment of the present invention, the device for performing the method according to the present invention may be designed as an SPI (serial peripheral interface)-bus interface.

DETAILED DESCRIPTION

Figure 1:
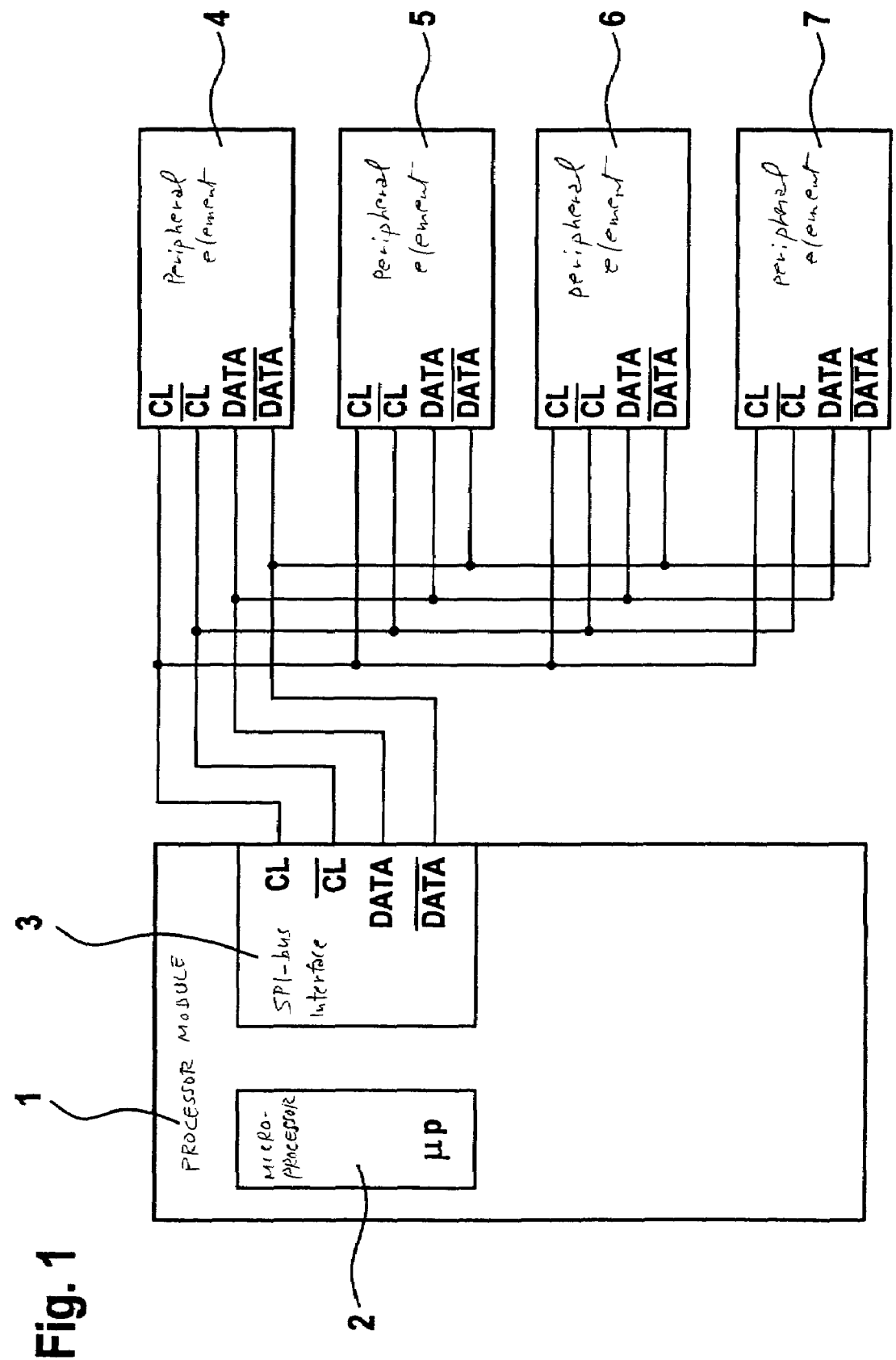
FIG. 1 shows a processor module according to an exemplary embodiment of the present invention.

In an electronic control unit, e.g., an engine control unit, a transmission control unit or a brake control unit in a motor vehicle, processor modules equipped with serial interfaces may be used in order to exchange data or signals with peripheral elements. In FIG. 1, a processor module according to an exemplary embodiment of the present invention is designated in its entirety by reference numeral 1. Processor module 1 includes a computing element 2 taking the form, for example, of a microprocessor. Processor module 1 also includes a device 3 for implementing the data or signal transmission between the processor module 1 and peripheral elements 4, 5, 6, 7 connected to the processor module. Device 3 is designed, for instance, as a serial interface, particularly as an SPI (serial peripheral interface)-bus interface. Peripheral elements 4, 5, 6, 7 may be, for example, a monitoring circuit, particularly a watchdog, a serial EEPROM (electronically erasable and programmable read-only memory), a stabilizing circuit or an output-stage circuit, for instance, for the injection of fuel for an internal combustion engine.

Four lines are provided for the data transmission between processor module 1 and peripheral elements 4, 5, 6, 7, namely:

two timing lines CL (clock) and $\overline{\text{CL}}$ (clock inverted) for the clock-pulse transmission, and two data lines DATA (data) and $\overline{\text{DATA}}$ (data inverted) between processor module 1 and peripheral elements 4, 5, 6, 7.

Timing lines CL and $\overline{\text{CL}}$ are also designated as clock lines. Data lines DATA and $\overline{\text{DATA}}$ may be implemented, for example, as a bus, particularly as an SPI bus. SPI functionalities with respect to peripheral elements 4, 5, 6, 7 may then be, for example, initialization, watchdog communication, output-stage diagnostic, reading in of inputs, identifier, writing and reading of data, etc.

For processor module 1 according to an exemplary embodiment of the present invention, it may be possible to dispense with a selection line, (so-called chip-select line), which is necessary in conventional communication between processor module 1 and each peripheral element 4, 5, 6, 7. Instead, the selection signals for addressing and synchronizing peripheral elements 4, 5, 6, 7 may be transmitted via data lines DATA and $\overline{\text{DATA}}$.

The timing signals and data signals are transmitted as differential signals via the two timing lines CL and $\overline{\text{CL}}$, and via the data lines DATA and $\overline{\text{DATA}}$, respectively. In this manner, particularly at higher data rates, the radiant emittance is reduced, and the electromagnetic compatibility (EMC) is improved.

Figure 2:
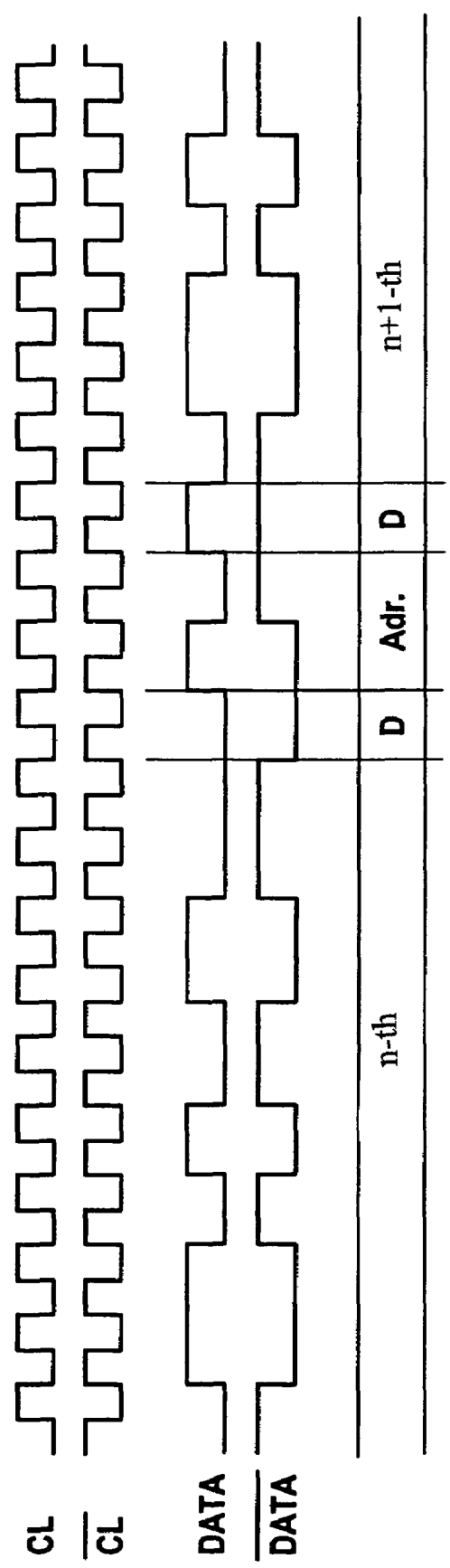
FIG. 2 shows signal patterns on timing lines and data lines between the processor module according to an exemplary embodiment of the present invention and a plurality of peripheral elements.

FIG. 2 shows the signal patterns of the timing signals on timing lines CL and $\overline{\text{CL}}$ and the data signals on data lines DATA and $\overline{\text{DATA}}$. In the exemplary embodiment shown, data lines DATA and $\overline{\text{DATA}}$ are operated in push-pull mode (normal differential operation). According to an exemplary embodiment of the present invention, the symmetry or parity of the transmission on data lines DATA and $\overline{\text{DATA}}$ is violated briefly for the synchronization and addressing of peripheral elements 4, 5, 6, 7. A symmetry or parity violation between two transmitted data words or a group of data words may be used for synchronizing peripheral elements 4, 5, 6, 7. Individual peripheral elements 4, 5, 6, 7 may be addressed by bits which are transmitted between two defined symmetry or parity violations.

After an $n^{th}$ data word, processor module 1 (so-called master) transmits a zero (0) briefly for one clock pulse on both data lines DATA and $\overline{\text{DATA}}$, thus producing a symmetry violation designated as a disparity D. Peripheral elements 4, 5, 6, 7 as bus users (so-called slaves) therefore recognize the end of the $n^{th}$ data word, and interpret the following data (two bits in the exemplary embodiment shown), for example, as an address for the addressing.

A further parity violation D, a one (1) in the example shown, on both data lines DATA and $\overline{\text{DATA}}$, signals to peripheral elements 4, 5, 6, 7 the end of the transmitted address and the beginning of the next $(n+1)^{th}$ data word. Peripheral element(s) 4, 5, 6, 7 which has/have recognized the address as its/their own may now, for example, retrieve and process the previous data word buffered in peripheral element 4, 5, 6, 7, in a similar fashion as would occur in a conventional system having a conventional selection signal (chip-select signal).

The address space between the two disparities D may, for example, be variable, depending on the number of peripheral elements 4, 5, 6, 7. For up to four peripheral elements 4, 5, 6, 7, as in the example shown, two address bits embedded between the two disparities D necessary for separating address and data may be sufficient to address all peripheral elements 4, 5, 6, 7 separately. Generally expressed, the address must include $\log_2(n)$ bits, n representing the number of peripheral elements 4, 5, 6, 7.

The prioritizing or use of list addresses is likewise possible in an exemplary embodiment of the present invention. In the simplest situation, the two disparities D may directly follow each other without an intervening address. Thus, for example, all peripheral elements 4, 5, 6, 7 may be addressed with the highest priority. If, in the example, only one bit is transmitted between disparities D, a group of two peripheral elements 4, 5, 6, 7 may be addressed simultaneously. In the case of a point-to-point connection, one disparity D may suffice for the synchronization.

What is claimed is:

1. A method for a serial transmission of data between a processor module and at least one peripheral element, comprising:

transmitting a timing signal via two timing lines between the processor module and the at least one peripheral element;

transmitting a data signal via two data lines between the processor module and the at least one peripheral element; and transmitting a selection signal via the two data lines;

wherein a symmetry of transmission of the data signal is violated for transmitting the selection signal.

2. The method of claim 1, wherein:

the data signal is transmitted on a first data line; and an inverted data signal is transmitted on a second data line.

3. The method of claim 2, wherein:

the timing signal is transmitted on a first timing line; and an inverted timing signal is transmitted on a second timing line.

4. The method of claim 1, further comprising:
synchronizing the at least one peripheral element by using a symmetry violation between two transmitted data words.

5. A method for a serial transmission of data between a processor module and at least one peripheral element, comprising:
transmitting a timing signal via two timing lines between the processor module and the at least one peripheral element:
transmitting a data signal via two data lines between the processor module and the at least one peripheral element; and
transmitting a selection signal via the two data lines; wherein:
a symmetry of transmission of the data signal is violated for transmitting the selection signal;
at least one specified bit is transmitted between two defined symmetry violations; and
the at least one specified bit is used to address the at least one peripheral element.

6. The method of claim 5, wherein an address space for addressing the at least one peripheral element is predefined by varying a time interval between the two defined symmetry violations.

7. A device for a processor module for serial transmission of data between the processor module and at least one peripheral element, comprising:
a first arrangement for transmitting a timing signal via two timing lines between the processor module and the at least one peripheral element;
a second arrangement for transmitting a data signal via two data lines between the processor module and the at least one peripheral element; and
a third arrangement for transmitting a selection signal via the two data lines;
wherein a symmetry of transmission of the data signal is violated for transmitting the selection signal.

8. The device of claim 7, wherein the data signal is transmitted on a first data line, and an inverted data signal is transmitted on a second data line.

9. The device of claim 7, wherein the device is a serial-peripheral-interface-bus interface.

10. A processor module, comprising:
a device for a serial transmission of data between the processor module and at least one peripheral element;
wherein the device transmits a timing signal via two timing lines between the processor module and the at least one peripheral element;
wherein the device transmits a data signal via two data lines between the processor module and the at least one peripheral element; and
wherein the device transmits a selection signal via the two data lines;
wherein a symmetry of transmission of the data signal is violated for transmitting the selection signal.

11. The processor module of claim 10, wherein the data signal is transmitted on a first data line, and an inverted data signal is transmitted on a second data line.

12. The method of claim 1, wherein the processor module is a control unit of a motor vehicle.

13. The device of claim 7, wherein the processor module is a control unit of a motor vehicle.

14. The processor module of claim 10, wherein the processor module is a control unit of a motor vehicle.

* * * * *